United States Patent [19]
Sakamoto et al.

[11] Patent Number: 5,283,027
[45] Date of Patent: Feb. 1, 1994

[54] METHOD OF MOLDING AN ACOUSTIC DIAPHRAGM PART OF PARA AROMATIC POLYAMIDE

[75] Inventors: Yoshio Sakamoto, Tokyo; Syuhei Ohta, Tate; Yuji Yabuki; Shigemitsu Muraoka, both of Miyazaki, all of Japan

[73] Assignees: Kabushiki Kaisha Kenwood, Tokyo; Asahi Kasei Kogyo Kabushiki Kaisha, Osaka, both of Japan

[21] Appl. No.: 26,198

[22] Filed: Feb. 26, 1993

Related U.S. Application Data

[60] Continuation of Ser. No. 770,221, Oct. 3, 1991, abandoned, which is a division of Ser. No. 549,175, Jul. 5, 1990, abandoned.

[30] Foreign Application Priority Data

Jul. 5, 1989 [JP] Japan .................................. 1-178989
Aug. 28, 1989 [JP] Japan .................................. 1-218701

[51] Int. Cl.⁵ .............................................. B29C 43/04
[52] U.S. Cl. .................................. 264/320; 264/331.12
[58] Field of Search .................... 264/320, 323, 331.12

[56] References Cited

U.S. PATENT DOCUMENTS

| | | | |
|---|---|---|---|
| 4,315,557 | 2/1982 | Nakaya et al. | 181/168 |
| 4,752,643 | 6/1988 | Imanishi et al. | 264/212 |
| 4,857,255 | 8/1989 | Imanishi et al. | 264/216 |
| 5,066,351 | 11/1991 | Knoll | 264/320 |

FOREIGN PATENT DOCUMENTS

| | | |
|---|---|---|
| 0303173 | 2/1989 | European Pat. Off. . |
| 54-118817 | 9/1979 | Japan . |
| 62-174129 | 7/1987 | Japan . |
| 63-278491 | 11/1988 | Japan . |
| 1338703 | 11/1973 | United Kingdom . |

*Primary Examiner*—James Lowe
*Attorney, Agent, or Firm*—Sixbey, Friedman, Leedom & Ferguson

[57] ABSTRACT

An acoustic diaphragm is manufactured from a film of para-orientation aromatic polyamide through a molding process. In the molding process, the die for the molding process is heated to a predetermined temperature and then the molding press is conducted onto the film of para-orientation aromatic polyamide. The combination of the dies and film are cooled into about 80° C. and then the clamping of dies is released to take the pressed film off.

1 Claim, 6 Drawing Sheets

METHOD OF MOLDING AN ACOUSTIC DIAPHRAGM PART OF PARA AROMATIC POLYAMIDE

This application is a continuation of Ser. No. 0 07/770,221, filed Oct. 3, 1991, now abandoned, which itself was a divisional of Ser. No. 07/549,175, filed Jul. 5, 1990, also abandoned.

FIELD OF THE INVENTION

The present invention relates to an acoustic diaphragm which is molded by a resin film and a manufacturing method of such an acoustic diaphragm and, more particularly, to the improvement of a material of a diaphragm for a speaker, a diaphragm for a microphone, a center cap for a speaker, and a suspension for a speaker and a manufacturing method of the improved material.

RELATED ART

An acoustic diaphragm system denotes a diaphragm, a voice coil bobbin, a center cap, and a suspension (edge, damper, and the like). When considering the diaphragm, as is well known, in recent years, a diaphragm obtained by molding a resin film has been used to solve the difficulty of mass production, drawbacks of material, and the like in the case of the diaphragm using a pulp. A film made of polyester, polypropylene, polyether-sulfone, polyamide, or the like is heat molded and worked into a predetermined shape.

On the other hand, when considering a conventional general heat molding work process of a film there are a vacuum molding process, a die molding process, and the like. The vacuum molding process is used as means for molding a thermoplastic film. As is well known, the film is heated to a temperature near a melting point, the film is absorbed by a vacuum force at a time point when the film was softened, and the softened film is adhered to the dies and molded.

However, the resin films which have been used hitherto have the following drawbacks.

That is, among the above conventional films, the number of films having a high propagation velocity of the sound (hereinafter, referred to as a "sound velocity") is small, an internal loss (hereinafter, referred to as a "tan δ") is small, and the films easily resonate in a use frequency band, so that the number of films which deteriorate the characteristics is large. On the other hand, in many cases, a polypropylene film having a large tan δ or the like is used. However, the film having a large tan δ has drawbacks such that the sound velocity is slow and a high band reproduction limit frequency is low.

The sound velocities and the value of tan δ of a polyamide film (hereinafter, referred to as a "PI film"), a polyphenylene-sulfide film (hereinafter, referred to as a "PPS film"), and the like which are referred to as what are called high property films in the conventional examples are as follows.
PI film A: Sound velocity 2200 m/sec, tan δ 0.015
PI film B: Sound velocity 1700 m/sec, tan δ 0.018
PPS film: Sound velocity 1900 m/sec, tan δ 0.010

Therefore, we have already proposed a substantially para-orientation aromatic polyamide film having a tensile elasticity of 600 kg/mm$^2$ or more (JP-B-57-17886, JP-A-62-37124, JP-A-62-174129, etc.).

However, in the films (for example, the above PI film and the like) which are generally called high property (heat resistance) films and the substantially para-orientation aromatic polyamide film which has already been proposed by us, it is said that the melting point is located on a further higher temperature side than a decomposition point of 550° C. To heat those films, an efficiency is extremely low in the case of the present heating method. Even if the films having such characteristics were heated, they are not softened and it is extremely difficult to use the vacuum molding process.

Therefore, as another molding method, there has been tried a method whereby the film is molded by a die molding process which can expect the press deformation of a molding material (film). A glass point of the PI film or the like lies within a range from 180° to 350° C. and in such a temperature range, the film can be relatively easily heated. Therefore, by properly setting the die temperature, the deformation resistance of the material remarkably decreases and the film can be easily molded. Therefore, the products of the PI film or the like have been realized by the above molding method.

On the other hand, although the material and its characteristics of a sheet, a film, or the like which is made of aromatic polyamide polymer lie in a wide range, as a conventional example in the die molding process or the like, as shown in an embodiment of JP-U-57-119986, there has been known an example in which an aromatic polyamide sheet (a sheet in which fibers made of meta-orientation aromatic polyamide are cut like chips and worked in an unwoven cloth state) called NOMEX TM or the like is put into hot water at 100° C. for six minutes or longer and, thereafter, is press molded like a cone by the dies which were heated and maintained at a temperature of about 200° C.

However, the above film of para-orientation aromatic polyamide, typically polyparaphenylene-telephthalamide (PPTA) does not have a glass point and as mentioned above, its melting point is set to a decomposition point of 550° C. or higher, a strength and a modulus of elasticity are extremely higher and a distensibility is lower as compared with those of an unwoven cloth such as NOMEX TM, a film, and the like which are made of meta-orientation aromatic polyamide. Therefore, such a film has characteristics such that a rigidity is extremely high, it is difficult to deform with a pressure, and the film is easily broken when the material is forcedly stretched. It is fairly difficult to use the heat die molding process and no product has been put into practical use. Actually, even if such a film was press molded by the dies (male and female dies) which were heated to about 200° C., the material is deformed when removing from the dies and the molded state is inadequate. The film is broken during the molding. The film is deformed after completion of the molding and the like, producing low yield. Therefore, there are many points to be solved when the products made of such a film are put into practical use.

To solve the above drawbacks, as a method for molding a diaphragm by a substantially para-orientation aromatic polyamide sheet, as shown in JP-A-63-278491, we have already proposed molding means other than the heat molding method. However, in the embodiments 1 and 2 according to such a method, the film is cut into a predetermined shape and the overlaid portions are coupled by an epoxy resin.

However, in the method of coupling the overlaid portions as mentioned above, the materials are discontinuous in the plane direction of the diaphragm. Therefore, the excellent acoustic characteristics of the material are once shut out in such discontinuous portions, the sound is propagated to the epoxy resin having inferior acoustic characteristics, and the shapes of the coupled portions are complicated. Therefore, a reinforcement adhesive agent to prevent noisy spurious vibrations and the like must be coated onto the portions other than the pure adhering portions. Thus, a coating amount of epoxy resin increases. The physical property of the diaphragm is dominated by the physical property (sound velocity: 2000 to 2500 m/sec) of the epoxy resin as a binder. There is a fear that the inherent excellent characteristics of the PPTA film are deteriorated. Moreover, there are drawbacks such that many processing steps are needed for the coupling means, so that mass production is difficult.

On the other hand, according to the embodiment 3 shown in JP-A-63-278491, a resin material is allowed to flow onto the surface of a conical die frame, a conical sheet is obtained by predetermined processes, a vertex portion of the conical sheet is cut, and thereby obtaining a cone type diaphragm. Therefore, although such a diaphragm is advantageous as compared with the embodiments 1 and 2 in terms of the performance, it is difficult to control the thickness of the sheet and there is a problem such that it is difficult to obtain enough diaphragm strength.

SUMMARY OF THE INVENTION

It is the first object of the invention to solve the drawbacks of the conventional acoustic diaphragms mentioned above and to provide an acoustic diaphragm in which by using the para-orientation aromatic polyamide film, a sound velocity is extremely high and an internal loss is large.

The second object of the invention is to provide a method of manufacturing an acoustic diaphragm in which the excellent acoustic characteristics of the para-orientation aromatic polyamide film are not lost and excellent mass productivity is derived.

To solve the above subjects, according to the invention, a film (the above PPTA film) made of substantially para-orientation aromatic polyamide having Young's modulus of 600 kg/mm$^2$ or more, and density less than 1.44 g/cm$^3$ is press molded by dies which were heated to at least 250° C. or higher, the dies are cooled until a proper temperature in the pressing state, and after that, by removing the film from the dies, a diaphragm for a speaker or a microphone is molded.

As in the case of a diaphragm, a single member such as diaphragm, center cap, edge member, or the like can be obviously molded. For instance, it is also possible to integratedly mold two or more adjacent parts such as (voice coil bobbin and diaphragm), (diaphragm and center cap), (diaphragm and edge), or the like.

On the other hand, a diaphragm of a laminate structure can be also obtained by heat molding the para-orientation aromatic polyamide film after it was previously adhered by an adhesive agent.

Uniform products can be efficiently manufactured by using the para-orientation aromatic polyamide film such that although it has excellent acoustic characteristics, there is no application as a diaphragm because of the absence of a proper molding method. The diaphragm obtained as mentioned above has the excellent characteristics such that the sound velocity is at least 2500 m/sec or more, actually, 3000 m/sec or more, and the value of tan $\delta$ is 0.03.

DETAILED DESCRIPTION OF THE PREFERRED EMBODIMENT

A resin film which is used in the invention is made of substantially para-orientation aromatic polyamide. Para-orientation aromatic polyamide denotes a polymer of a repetitive structure in which the para-position of aromatic ring or the position similar thereto is coupled by an amide radical. Generally, although PPTA is most frequently used, in order to further improve the moldability or the like, for instance, it is also possible to substitute p-phenylene radical by, for instance, 4, 4'-diphenylene, 1, 4'-naphthalene, 1, 5-naphthalene, 2, 6-naphthalmr, 4, 4'-diphenylene-ether, 3, 4'-diphenylene-ether, or a substitution product of their halogen, alkyl, nitro, etc., or to introduce the above substituting group to the p-phenylene radical, or the like. On the other hand, poly (p-benzamide) can be also used.

The film which is used in the invention has a Young's modulus of 600 kg/mm$^2$ or more and has a distensibility of 20% or more from a viewpoint of the breakage, molding stability, or the like upon press molding and also has a density of 1.44 g/cm$^3$ or less. Therefore, such a film is advantageous for acoustic characteristics. To adjust the surface property, moldability, and characteristics, it is also possible to add a filler such as glass fiber, carbon fiber, carbon particles, carbon whiskers, talc, silica, etc. and voids can be also contained by using an expanding method or the like.

The resin film which is used in the invention can be manufactured by, for instance, the methods disclosed in JP-A-57-17886, JP-A-62-37124, JP-A-62-174129, and the like.

Figure 1:
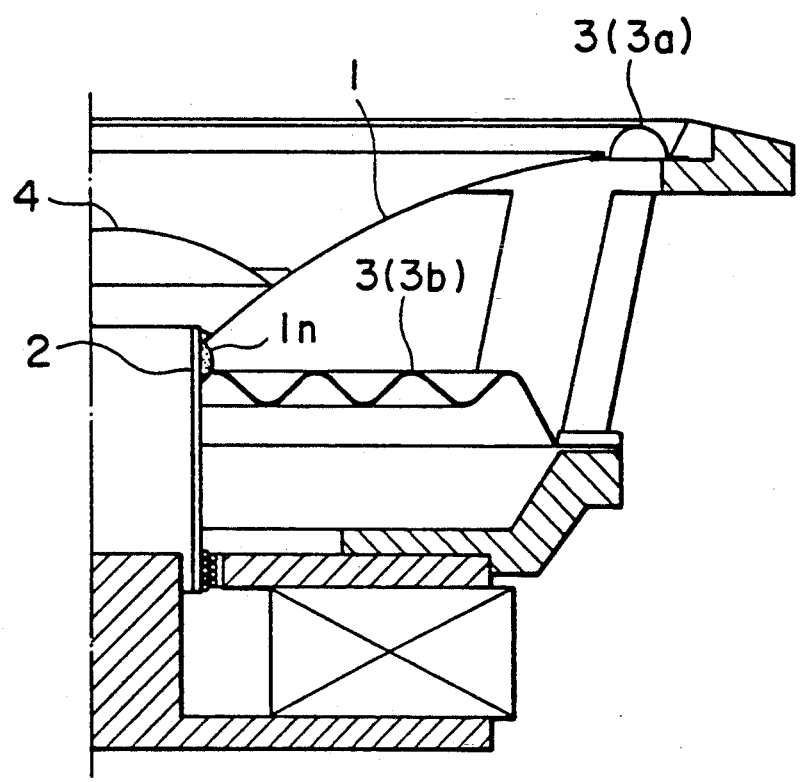
FIG. 1 is a cross sectional view of a main section for explaining a diaphragm of a speaker.

An embodiment of the invention will be described on the basis of FIGS. 1 to 4. FIG. 1 is a cross sectional view of a main section of a speaker. In the diagram, reference numeral 1 denotes a diaphragm; 2 a voice coil bobbin; 3 a suspension such as edge 3$a$, damper 3$b$, and the like; and 4 a center cap. The above components relate to a diaphragm as an object of the invention.

EMBODIMENT 1

Figure 2:
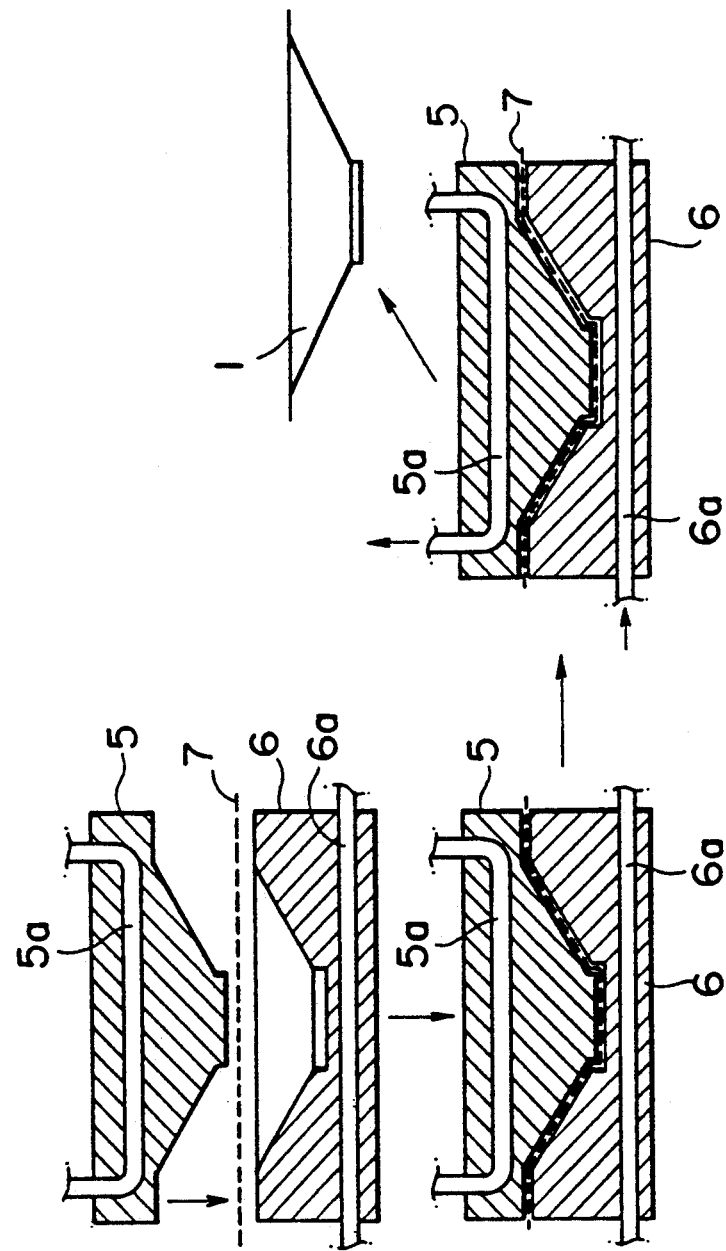
FIG. 2 is a processing step diagram showing an embodiment of a manufacturing method according to the invention.

Embodiment 1 relates to an example in the case of molding the cone-shaped diaphragm 1. As shown in FIG. 2, press dies comprising a male die 5 and a female die 6 having coolant passages 5$a$ and 6$a$, respectively, are used. The female die 6 is heated to 380° C. or higher and the male die 5 is heated to 280° C. or higher, respectively. A PPTA film 7 in which a thickness is set to about 60 μm, a Young's modulus is set to 1020 kg/mm$^2$, a distensibility is set to 34%, a density is set to 1.402 g/cm$^3$, a sound velocity is set to 3400 m/sec, and tan δ is set to 0.038 was press molded at a pressing speed of about 15 to 20 mm/sec. The PPTA chemical formula is as below.

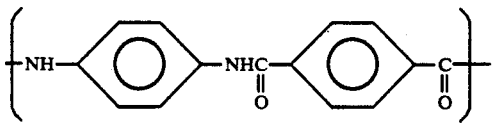

In the case of the PPTA film which is used in the embodiment, when the dies are set into the above heating state, the breakage distensibility is increased by about 50%. However, since the breakage strength decreases by about 80%, the selection of the pressing speed is important. On the other hand, since the molded film just after completion of the pressing operation is very fragile, the strength of the film is recovered by cooling the dies 5 and 6 to about 80° C. by flowing a cooling water through the coolant passages 5a and 6a in the pressing state. That is, after the dies in the pressing state were cooled, by releasing the dies, the film is molded into a desired diaphragm shape. After the film was removed, the surplus portion is eliminated by a trimming work, so that the cone-shaped diaphragm 1 was obtained.

Figure 3:
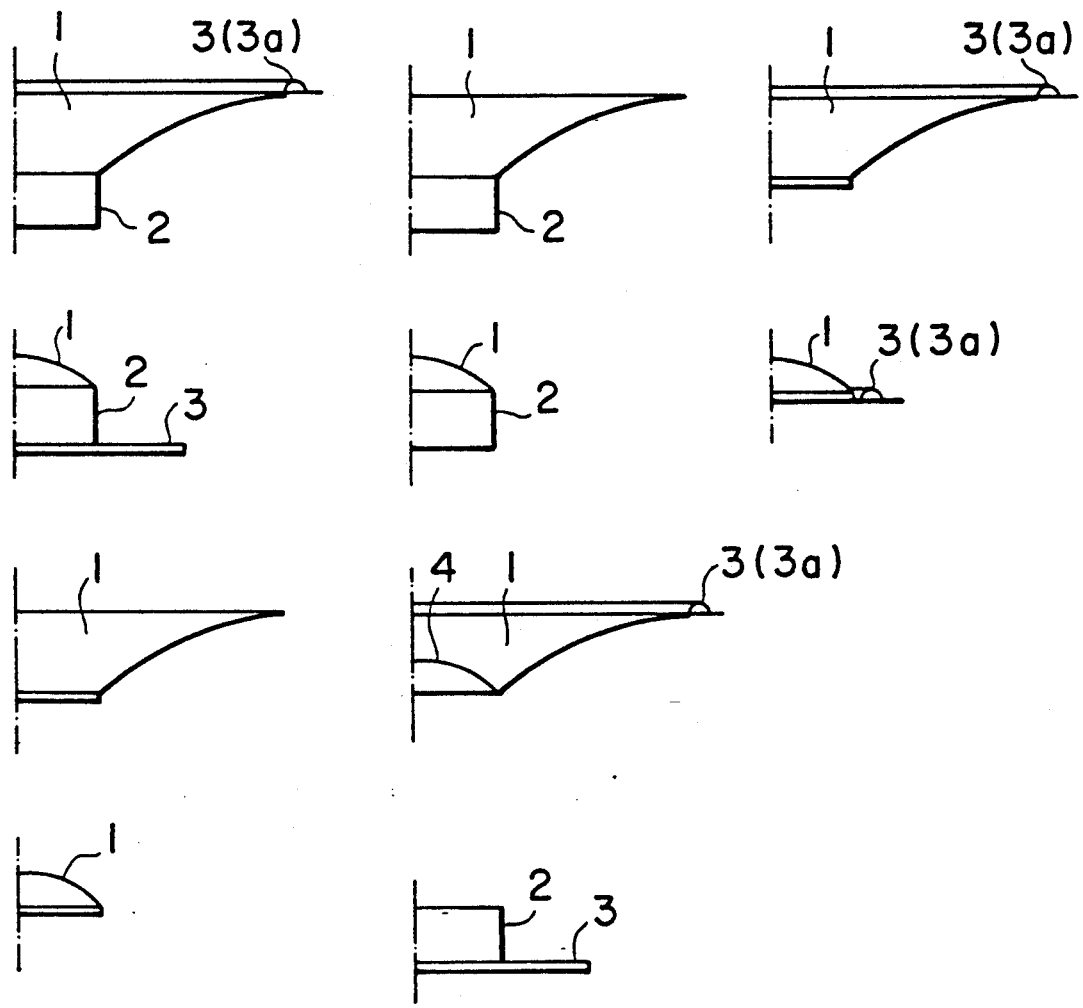
FIG. 3 is a semicross sectional view showing various forms of acoustic diaphragms according to the invention.

Although the embodiment shown in FIG. 2 relates to the example in which the core-shaped diaphragm is manufactured, a dome-shaped diaphragm can be also manufactured. As shown in FIG. 3, on the other hand, at least two or more parts among the diaphragm 1, voice coil bobbin 2, edge 3a, damper 3b, and center cap 4 can be also integratedly molded by the foregoing press molding means.

EMBODIMENT 2

The PPTA films can be also laminated to two or more layers and molded. In the embodiment 2, two PPTA films in which Young's modulus is set to 1200 kg/mm$^2$, distensibility is set to 23%, and a density is set to 1.405 g/cm$^3$ were adhered with an adhesive agent and laminated. The adhesive agent was coated by using a well-known coating machine, so that the adhesive agent could be extremely thinly and uniformly coated. The drawback as in the conventional example such that the diaphragm is influenced by the physical property of the adhesive agent is eliminated. The performance could be improved by considering the material of the adhesive agent.

The physical property of the laminate film is such that the sound velocity is set to 3550 m/sec and tan δ is set to 0.045. The value of tan δ could be increased without making the sound velocity slow. After the diaphragm had been molded by the laminate product, a part of the diaphragm was cut out and its physical property was measured. Thus, little change was found compared with the physical property of the laminate product before molding.

EMBODIMENT 3

As another example of the laminating method, after films were molded into a predetermined diaphragm shape, the molded products can be also laminated. As such an embodiment, a rubber system adhesive agent is coated by a spray onto one surface of one of two molded products which were molded into a diaphragm shape by using the PPTA films in which a Young's modulus is set to 1200 kg/mm$^2$, a distensibility is set to 24%, and a density is set to 1.400 g/cm$^3$. A solvent is volatilized. After that, the two molded products are adhered by the heat pressing process by a heat reactivating method. A part of the laminate diaphragm was cut out and the physical property was measured. Thus, the sound velocity was set to 3000 m/sec and tan δ was set to 0.075. Although the sound velocity was slowed slightly, tan δ was increased.

As is well known, since the physical property is improved by evaporation depositing metal or the like onto the front or back surface of the film, by using the film which was subjected to such a process, it can be also molded. Or, after the film was molded, metal or the like can be also evaporation deposited.

Although the diaphragm has been molded as mentioned above in the embodiment 1, the center cap mentioned above in the embodiment 1, the center cap 4, edge 3a, or suspension such as damper 3b or the like can also be formed by this method.

Although it is a general way to change the conditions such as a molding temperature and the like in accordance with the molding shape, when a film thickness is set to about 25 μm, the film can be also molded even if the male die 5 is set to about 250° C.

Figure 4:
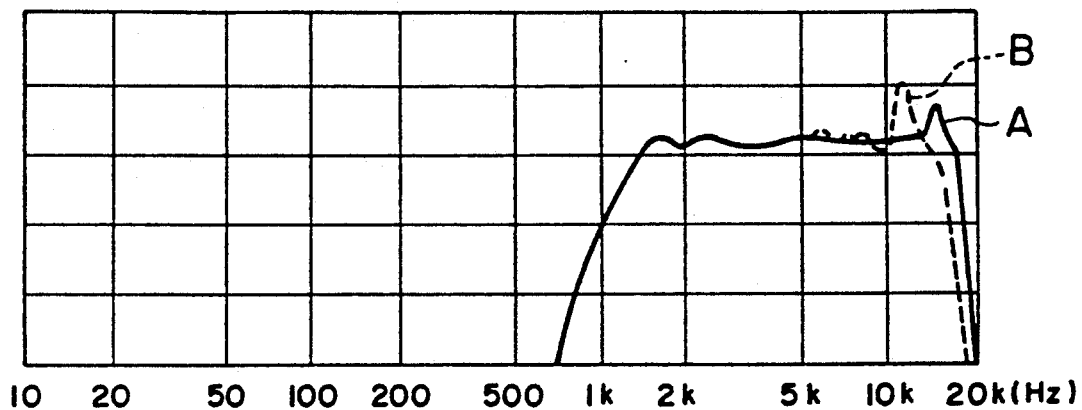
FIG. 4 is a frequency comparison characteristic graph between a speaker using the diaphragm obtained by the embodiment 1 and a speaker using a conventional resin film diaphragm.

FIG. 4 is a frequency comparison characteristic graph between a speaker A using the diaphragm obtained by the embodiment ① and a speaker B of a diameter of three inches using the conventional diaphragm made of a PI resin film. It will be understood that the characteristics in the high frequency band of the speaker A of the diaphragm according to the invention were remarkably improved.

Figure 5:
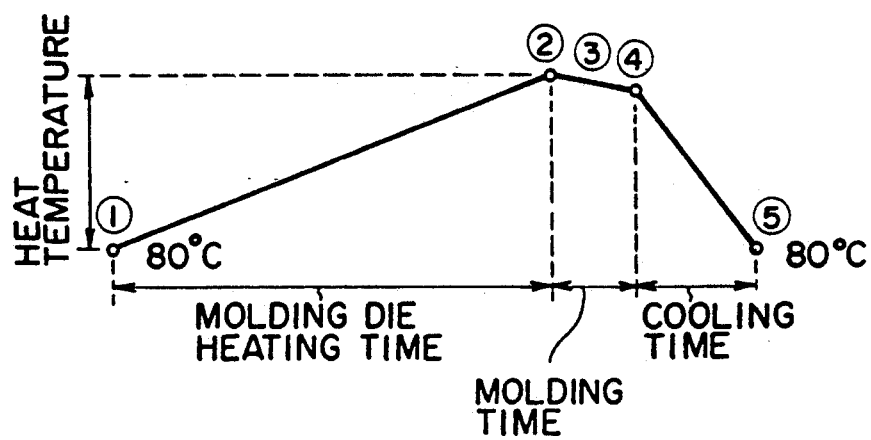
FIG. 5 shows the time schedule of the molding process.
Figure 6:
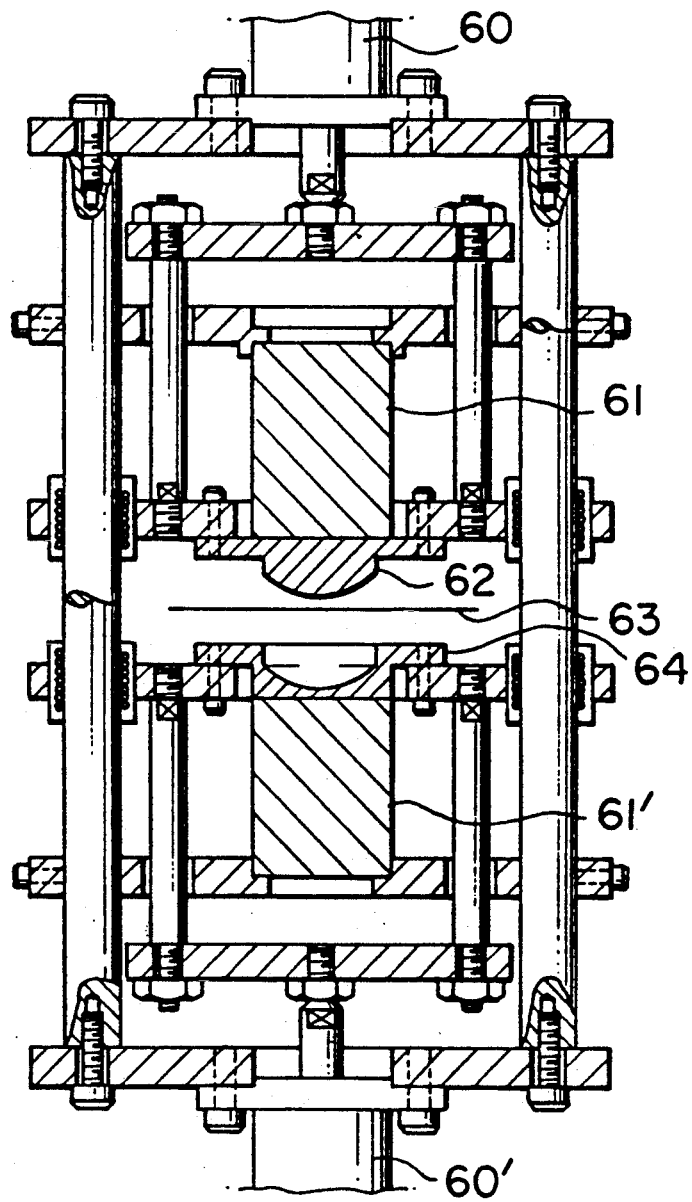
FIG. 6 is a cross sectional view of the molding system used in the present invention.

The time schedule of molding process as shown in FIG. 5 is conducted through a molding system as shown in FIG. 6. The molding dies 62 and 64 is heated from starting point 1 by heater blocks 61 and 61' during 3-25 minutes. At point ② cylinders 60 and 60' is operated to press film 63 with dies 62 and 64. At point ③ the die is clamped. The cooling step follows the 2-10 second molding. The combination of dies and film are cooled by passing coolant through passages 5a and 6a provided in the dies of FIG. 2 or by blowing cooled air to the dies during about 1 minute. After the dies and film have been cooled to about 80° C., the clamping of dies in released so that the pressed film can be taken out.

According to the acoustic diaphragm of the invention, the film made of para-orientation aromatic polyamide has extremely excellent acoustic characteristics in which the sound velocity is set to 3000 m/sec or higher and tan δ is set to 0.03 or more. When considering the diaphragm, the performance is greatly superior to that of a diaphragm made by the conventional resin film molding. Particularly, diaphragms having a much larger tan δ than those made with conventional resin film can be obtained. Therefore, the stiffness of the joint portion with the voice coil bobbin, that is, the portion which is generally called a neck portion ln can be increased. Therefore, it is difficult to cause a peak in the high reproducing frequency on the characteristics. The sound velocity is faster than that of the conventional resin film diaphragm. That is, since the elasticity is high, the flexural oscillation in the high frequency band is reduced, and the divisional vibration can be eventually prevented. Flatness in the high frequency band can be easily obtained. The characteristics were be remarkably improved as will be also obviously understood from the comparison characteristic graph of FIG. 4.

On the other hand, by molding only the center cap and attaching it to a conventional speaker diaphragm or the like, the sound quality can be adjusted. Further, as a suspension, since it has an extremely high creep resistance, it can be used as a high-power speaker suspension.

As a manufacturing method, since the diaphragm of the invention can be fundamentally molded by the resin film molding method which has conventionally been used, the products can be remarkably easily mass produced. Therefore, a diaphragm of a higher property than the member such as a conventional diaphragm or the like can be easily manufactured.

Figure 7A:
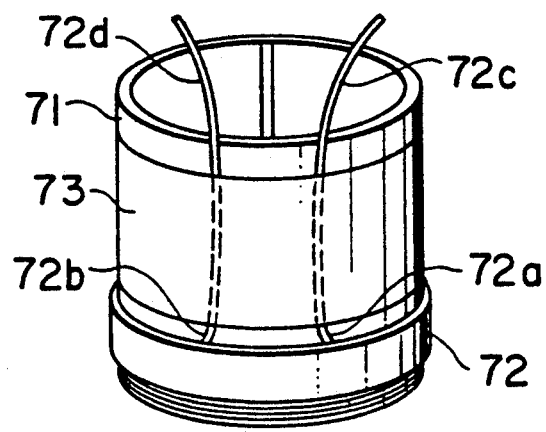
FIG. 7 shows a voice coil bobbin structure according to the present invention.
Figure 7B:
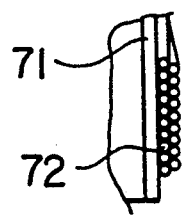

Referring to FIG. 7A and FIG. 7B, the PPTA film is cut into strips. The strips are put together into a cylinder bobbin 71 by bonding the strings at their edges. Coil wire 72 is wound on the bobbin 71 and leads 72a–72c and 72b–72d of coil wire 72 are fixed by rolling up paper sheet 73. The PPTA film used in this embodiment has the thickness of 50 or 55 $\mu$m, Young's modulus of 1150 or 1460 kg/mm$^2$, density of 1,400 or 1,405 g/cm$^3$, acoustic velocity of 3580 or 3720 m/sec and tan $\delta$ of 0.038 or 0.400. The voice coil bobbins fabricated in the above have a very high rigidity and thus can prevent spurious vibration at the connection part of the voice coil bobbin and diaphragm.

While the diaphragm is fabricated through the molding process as illustrated in the above embodiments, a voice coil bobbin is produced from a film of para-orientation aromatic polyamide, preferably PPTA without using a molding process.

As noted above, and as is known to those of ordinary skill in the art, the melting point of the para-orientation aromatic polyamide may be about 550° C. In the specific embodiments disclosed above, it is disclosed that the dies are heated in a range of 250° C. to 280° C. Thus, it will be apparent to the reader that the preferred heating temperature range disclosed for the dies approximately half the melting point of the para-orientation aromatic polyamide.

What is claimed is:

1. A method of molding a film of para-orientation aromatic polyamide into an acoustic diaphragm part comprising the steps of:
   (a) providing female and male dies;
   (b) heating the female and male dies to a temperature of approximately half the melting point of the para-orientation aromatic polyamide;
   (c) setting the film of para-orientation aromatic polyamide between the heated female and male dies;
   (d) pressing the set film by the heated dies at a pressing speed of from 15 mm/sec. to 20 mm/sec. to form the acoustic diaphragm part;
   (e) cooling the dies to a temperature below approximately 80° C. while maintaining said pressing; and
   (f) releasing the dies to remove the formed acoustic diaphragm part from the dies.

* * * * *